United States Patent [19]
Hunt

[11] Patent Number: 5,224,414
[45] Date of Patent: Jul. 6, 1993

[54] MOISTURE PREVENTION VALVE IN AN APPARATUS FOR THE PREPARATION OF LIQUID BEVERAGE FROM SOLID AND LIQUID COMPONENTS

[75] Inventor: Roderick C. Hunt, Louisville, Ky.

[73] Assignee: Grindmaster Corporation, Louisville, Ky.

[21] Appl. No.: 951,449

[22] Filed: Sep. 25, 1992

[51] Int. Cl.$^5$ ............................................. A47J 31/42
[52] U.S. Cl. ........................................ 99/286; 99/285; 99/287; 99/289 R; 241/100; 241/222
[58] Field of Search ................ 99/285, 279, 286, 287, 99/289 R, 289 D, 289 P, 290; 426/433; 241/101.2, 282.1, 282.2, 277, 100, 222, 225

[56] References Cited

U.S. PATENT DOCUMENTS 4,913,037  4/1990  Newnan .................... 99/286

Primary Examiner—Robert W. Jenkins
Attorney, Agent, or Firm—Smith Vance A.

[57] ABSTRACT

The present invention involves an improvement to a beverage making apparatus in which a slide valve assembly for preventing moisture from seeping into an area holding the solid component of a beverage mix is provided with a finger tab. The tab serves as a grasping device to manipulate the slide valve between open and shut positions and as a deflector of the solid material ejected from the holding area.

20 Claims, 5 Drawing Sheets

MOISTURE PREVENTION VALVE IN AN APPARATUS FOR THE PREPARATION OF LIQUID BEVERAGE FROM SOLID AND LIQUID COMPONENTS

FIELD OF THE INVENTION

This invention relates to a beverage preparation apparatus in which a liquid component and a solid component such as a powder or coffee grounds are mixed to form a beverage and, more particularly, an apparatus in which a slide valve is used to protect the solid component from moisture emanating from the mixture of liquid and solid such as in a combination coffee bean grinder and brewing apparatus.

BACKGROUND OF THE INVENTION

Apparatus used to make beverages from a solid component and a liquid component for distributing directly to the consumer are legion in number. One example is machines which meter a predetermined amount of powder and water to a mixing area. Another example is combination coffee grinders and brewers that are finding great acceptance from restaurants and the like. Brewing coffee directly from freshly ground beans in the same apparatus has considerable appeal. A typical combination grinding and brewing apparatus employs a hopper which upon a signal discharges beans into a proportioning device which measures the desired quantity of beans. The beans are then transferred to a grinder that grinds the beans to a desired consistency after which the ground coffee is delivered to a filter within the brewing basket immediately before hot water is sprayed over the grounds. A common feature in most apparatus of this type is the use of a sealing structure which prevents moisture emanating from the hot water tank and brewing basket from reaching the interior of the grinder assembly. Wetting of the grounds prior to reaching the brewing basket is undesirable, particularly when the grounds are still in the grinder itself. It causes problems with the proper distribution of the ground coffee to the brew basket and is difficult to clean.

A number of structures have been devised to prevent the egress of unwanted moisture into the grinder. An example may be found in U.S. Pat. No. 4,913,037 issued to Brian D. Newnan and assigned to the same assignee as the present invention. In the patent, the passage between the grinder and the brew basket is conveniently sealed by a solenoid operated valve which is open during the grinding operation but closes when the grinder motor shuts down. The valve is a flap of material which is pivotally mounted, biased into a closed position and responsive to the movement of a solenoid plunger for opening the passageway. The valve can also be manually opened by use of a finger tab thus allowing access into the passageway for cleaning when required. The passageway itself is defined by an elbow shaped hood which serves to guide the coffee grounds when ejected from the grinder through the valve opening into the brew basket.

The aforementioned prior art valve is extremely suitable for the purpose intended, but does not meet the requirements of combination grinder brewers in which space is severely restricted. The pivoting action of the prior art valve and the linkage to the solenoid plunger require valuable space as does the passageway defined by the elbow shaped hood. It therefore would be desirable to have an apparatus having a valve assembly in which the moisture of the brewing operation could be sealed off during the brewing cycle without the sacrifice of valuable space while simultaneously maintaining good coffee ground dispersal across the filter paper within the brew basket. Additionally, the valve assembly should allow for easy manual access into the valve interior for cleaning and maintenance.

SUMMARY OF THE INVENTION

The present invention provides for a coffee grinding and brewing apparatus in which the passageway communicating with the grinder and brewing area is selectively opened when the grinder motor is activated and closed when not. Thus, moisture emanating from the brewing cycle cannot reach the grinder as the passageway there between is sealed shut. The invention contemplates the use of a slide plate or shutter that is directly connected to a solenoid by a solenoid plunger. The shutter plate also has an opening. When the grinder is activated, the solenoid is activated and moves the shutter into an open position in which the opening of the shutter is in registry with the opening of the grinder head. The movement of the solenoid plunger and plate are essentially coplanar which reduces the number of working and moving parts. Moreover, the shutter is provided with a tab finger which extends into the brewing area a sufficient distance to deflect at least a portion of the stream of coffee grounds ejected from the grinder thereby ensuring the coffee grounds are properly distributed prior to brewing. The timing of operation sequence is such that the solenoid valve remains operational for a predetermined time period after the grinder ceases operation. Once the predetermined time period has elapsed, the solenoid shuts off and a biasing element closes the shutter just prior to the brewing cycle so that moisture therefrom does not proceed into the grinding head.

The above and other features and advantages of this invention and the manner of realizing them will become more apparent, and the invention itself will best be understood, from a study of the following and appended claims, with reference being made to the attached drawings showing some preferred embodiments of the invention.

DETAILED DESCRIPTION OF THE PREFERRED EMBODIMENTS

Figure 1:
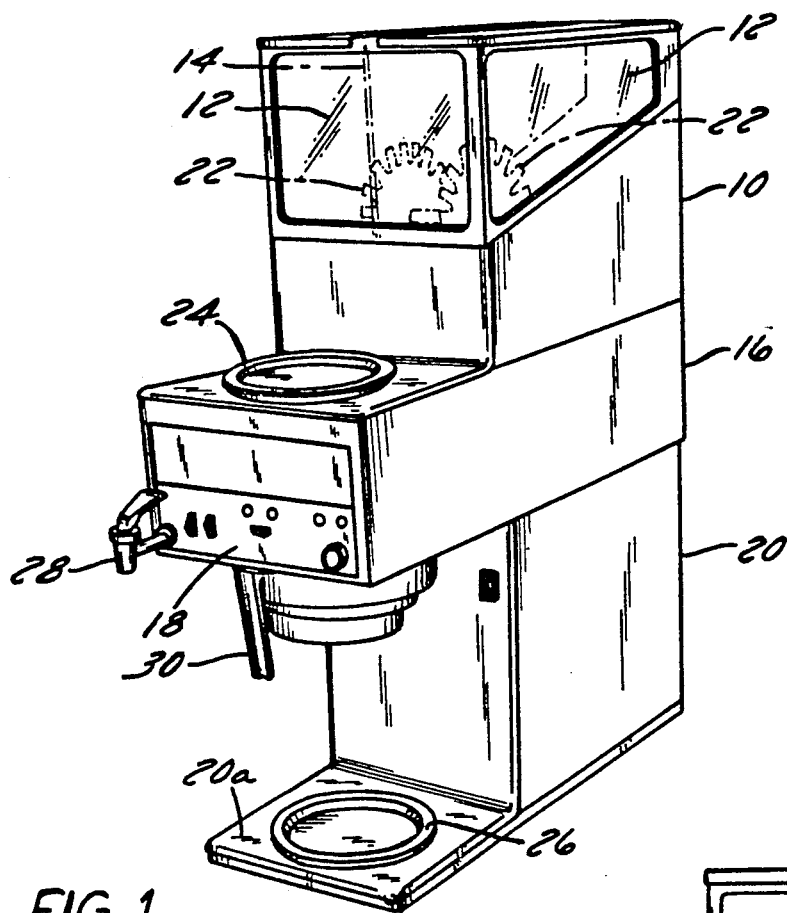
FIG. 1. shows a perspective view of a grinder brewer assembly in which the preferred embodiment of the invention forms a component.
Figure 2:
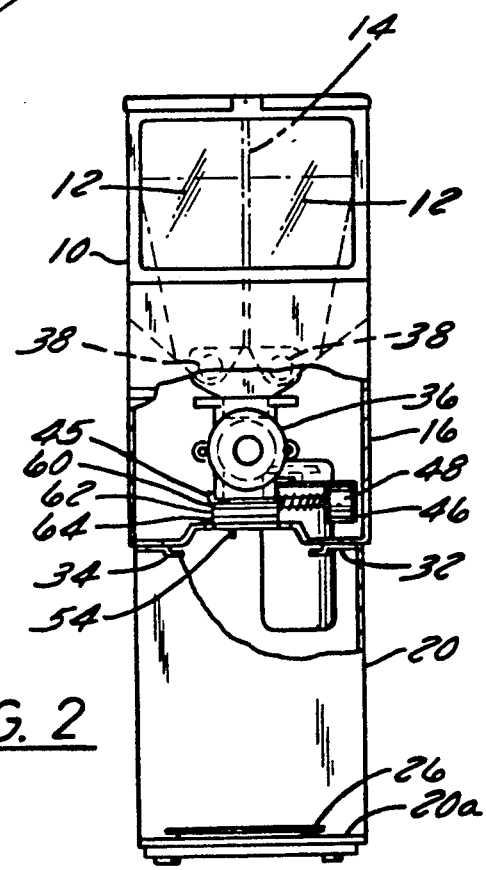
FIG. 2. is a front view of FIG. 1, partially broken away, to illustrate the front side of the grinder and its spacial relationship with the grinder motor and the solenoid operated valve assembly.
Figure 5:
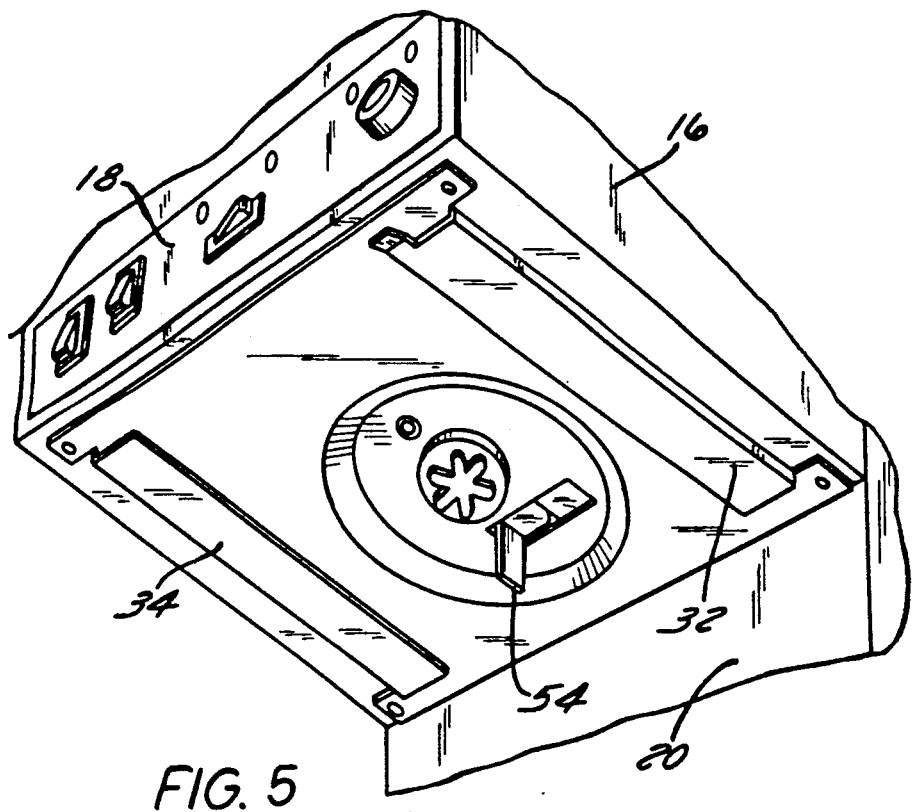
FIG. 5. is a perspective view of the underside of the grinder assembly showing the brew basket carrying arms and the closed valve opening and protruding finger tab and deflector.
Figure 6:
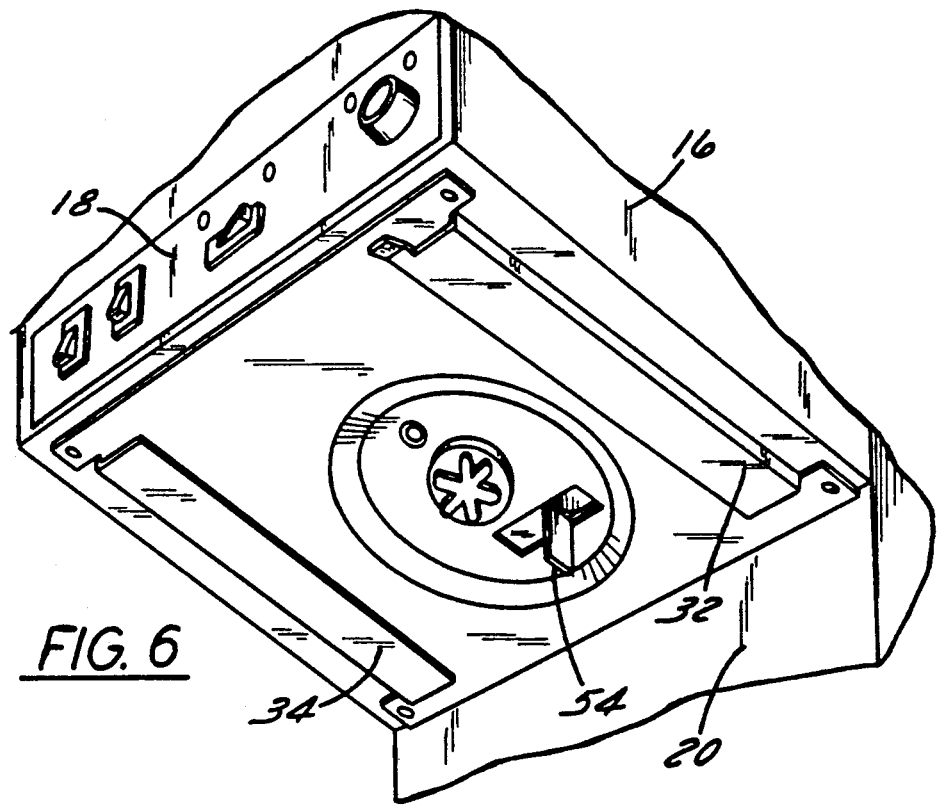
FIG. 6. is the same view a FIG. 3 except the valve is shown in the open position with the tab disposed to the right.

The perspective of FIG. 1 illustrates the front and side exterior of a dual hopper grinder brewer apparatus described in greater detail in commonly assigned and copending applications U.S. Ser. Nos. 07/816,749 filed Jan. 2, 1992 and concurrently filed U.S. Application Ser. No. 07/951,674, filed Sep. 25, 1992. The details of the auger-grinder-brewer assembly of the referenced application are not essential for the understanding of the present invention. Generally, as depicted the dual hopper, grinding and brewing apparatus can be visualized best by being comprised in three sections: a hopper section 10 comprising a pair of hoppers 12 separated by an interior wall 14; a panel section 16 containing the front control panel 18; and a lower section 20. Positioned in each hopper 12 is an agitator wheel 22 serving to break up clumps of coffee beans and move the coffee beans within each hopper. A pair of electrically heated plates 24 and 26 ar respectively mounted on the top surface of panel section 16 and extension 20a of the lower section 20 function to maintain coffee in coffee decanters warm. The control panel 18 is provided with the various manual controls needed to operate the apparatus including a hot water spigot 28 for obtaining hot water for other beverage needs. A brew basket 30 for holding the filter paper and coffee grounds is mounted beneath the underside of the panel section 16 between a pair of brew basket arms 32 and 34 as seen in FIGS. 5 and 6. As seen in the front view of FIG. 2, grinder 36 is mounted in the panel section 16 beneath the hoppers 12 to receive the coffee beans that are transferred from a selected hopper by an auger mechanism 38 shown in dashed lines.

Figure 3:
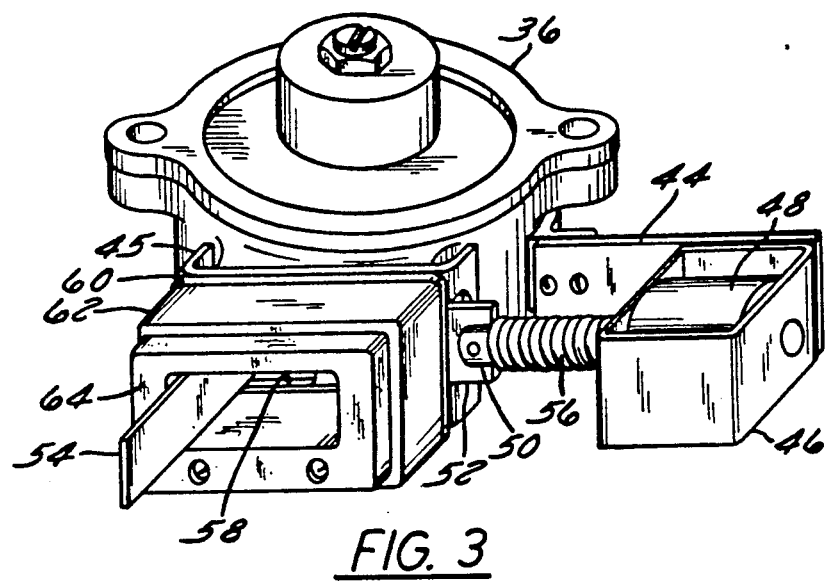
FIG. 3. is a perspective view of only the grinder and valve assembly.
Figure 4:
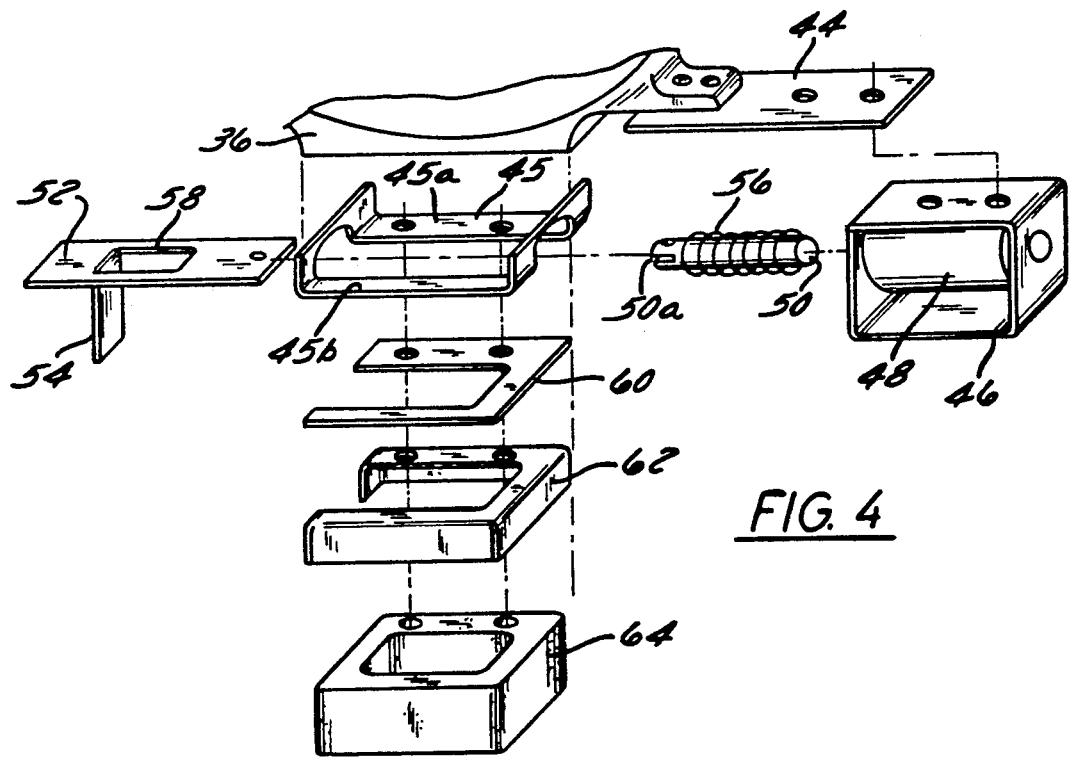
FIG. 4. is an exploded perspective of the valve assembly.

Referring now to FIGS. 3 and 4, a solenoid support plate bracket 44 is secured directly to the grinder 36. Solenoid valve housing 46 is mounted on bracket 44 by any appropriate fastener element such as metal screws or rivets. Slide valve spacing bracket 45 has a pair of legs 45a and 45b mounted beneath grinder 36 and are spaced sufficiently far apart to register with the edges of the opening into the grinder 36. One end of bracket 45 is crimped to fit about grinder head 36 to help prevent any slippage caused by vibrations and the like and to maintain the flatness of the spacer plate.

Mounted within housing 46 is a solenoid 48 having a solenoid plunger 50 which extends through an opening (not shown) in housing 46. The distal end 50a of plunger 50 is provided with a slot for receiving shutter plate 52 which is secured to the end of plunger 50 by a pin (not shown). Shutter plate 52 has a width which allows it to slide freely between but in close tolerance with the interior edges of legs 47. A finger tab 54 extends downwardly from the left side of shutter plate 52 as viewed in FIG. 4. A helical spring 56 is coiled about plunger 5 and abuts the end of shutter plate 52 and the facing wall of solenoid housing 46. Shutter plate 52 further defines an opening 58 which is essentially the same size as the opening in grinder head 36 and registers therewith when shutter plate 52 is in its open position. However, spring 56 biases shutter plate 52 is a closed position when solenoid 48 is not operative.

A bearing surface for shutter plate 52 is provided by a sheet 60 of low friction wear resistant material secured to the underside of legs 45a and 45b by seal keeper 62 and seal 64. Shutter plate 52 is made slightly thinner than bracket 45 to ensure that plate 52 can slide freely over sheet 60 when in operation. Sheet 60, keeper 62, and seal 64 collectively define an opening which is longer than the opening in shutter plate 52, thus allowing tab finger 54 to extend downwardly there through as shown in FIG. 3. As best seen in FIGS. 5 and 6, this larger opening as defined above allows movement of the finger tab into the various positions as shown. Components 60, 62 and 64 have legs similar in shape to legs 45a and 45b, but with greater width, to provide a support and bearing surface for shutter plate 52. Sheet 60 may be made of any low friction and wear resistant material such as, for example, sheets of Teflon (registered trademark of the Du Pont Company). Using low friction material greatly reduces the coffee and other residue build up between the shutter plate and bearing surface. Cleaning and maintenance are greatly facilitated.

From FIGS. 3 and 4, it can clearly be seen that shutter plate 52 and solenoid plunger 50 are directly connected and in line, i.e., essentially co-planar. The advantages of the co-planar positioning is that misalignment (as found in prior art shutter mechanisms) is minimized. Additionally, fewer working parts are needed which reduces mechanical problems and increases service life.

Figure 10:
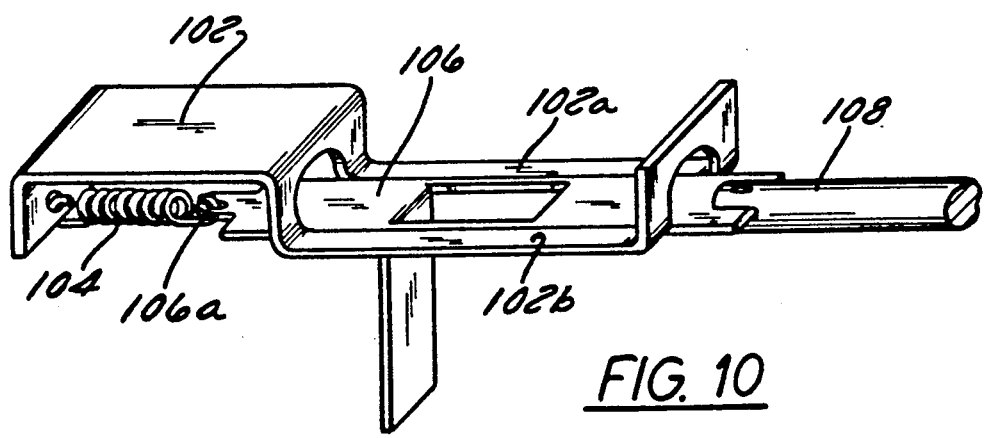
FIG. 10 is a perspective view of an alternate positioning of the biasing spring showing only the spring and modified bracket structure for the same.

An alternate construction may be employed for the placement of the spring as shown in FIG. 10. Instead of using the spring in compression to maintain the bias of the shutter plate in a closed position, the spring may be used to provide a bias from an extended position. To accomplish this the bracket would be extended as illustrated by bracket 102 to form an inverted U-shape. One end of spring 104 is connected to bracket 102 and the other end secured to a tab extension 106a of shutter plate 106. Shutter plate 106 slides between legs 102a and 102b of bracket 102 as described above with respect to shutter plate 52. Shutter plate 106 is coupled to solenoid plunger 108 of solenoid (not shown) and functions in an almost identical manner as shutter plate 52, the difference being that plunger 108 pulls plate 106 into a closed position and extends spring 104.

Figure 7:
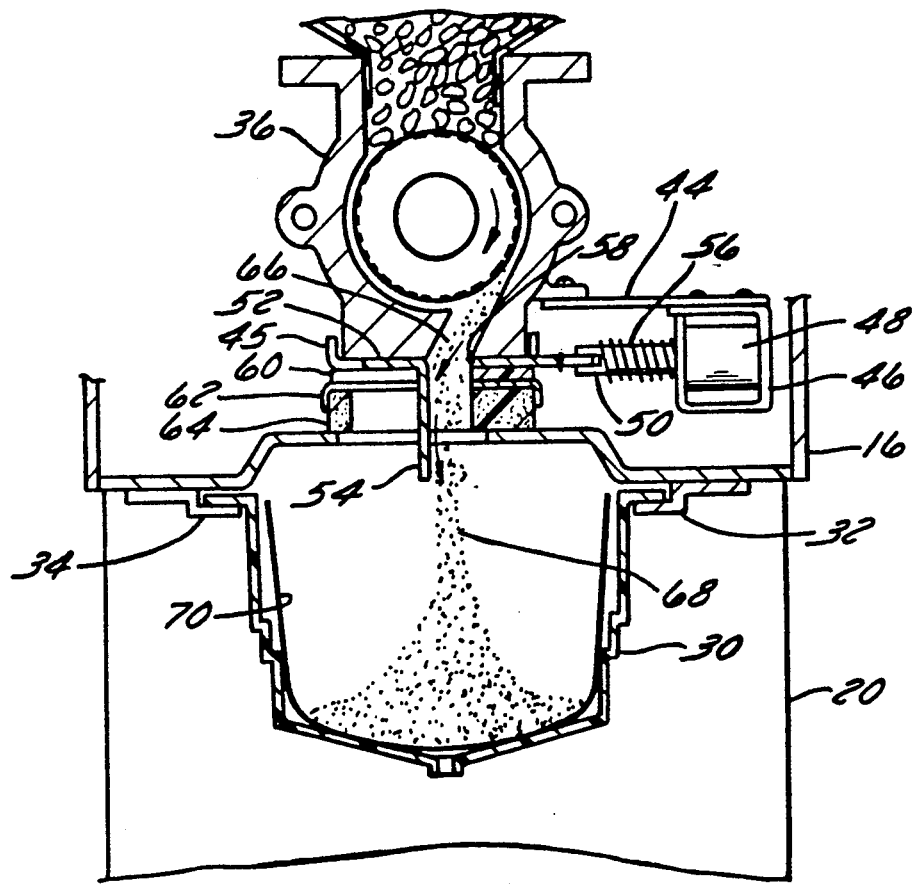
FIG. 7. is a front sectional view of the grinder head and solenoid slide assembly when the slide is in the open position demonstrating the deflection of a coffee ground stream by the downwardly extending finger tab.

Reference is now made to FIG. 7 which illustrates one of the functions of finger tab 54 which takes place during grinder operation. During the grinder cycle the shutter plate 52 is moved against the biasing force of spring 56 by action of solenoid plunger 50 so that opening 58 registers with opening 66 in grinder head 36. In the plane of FIG. 7, the grinding burrs of grinder head 36 spin in a clock-wise motion causing the coffee grounds 68 to be thrown toward the left side of the brew basket 30 lined with a filter 70. Ordinarily, the distribution of the coffee grounds within filter 70 would be skewed to one side which could deleteriously effect the quality of the brewed coffee. However, finger tab 54, which extends down through the opening defined by keeper 62 and seal 64, deflects grounds 68 to provide a more even distribution of the coffee grounds over filter 70. The tangential flow of the coffee allows for higher exit velocity which aids distribution and also cleaning of the grinder head. It should be noted, however, that the opening 66 is not centered in relationship to the passageway defined by the various valve components in order to ensure that the coffee stream impacts further down the passageway and against tab 54.

Additionally, finger tab 54 also permits shutter 52 to be manually opened as shown in FIG. 4 against the bias of shutter spring 56. Manual opening of the shutter plate greatly assists the cleaning and maintenance of the shutter mechanism.

Figure 8:
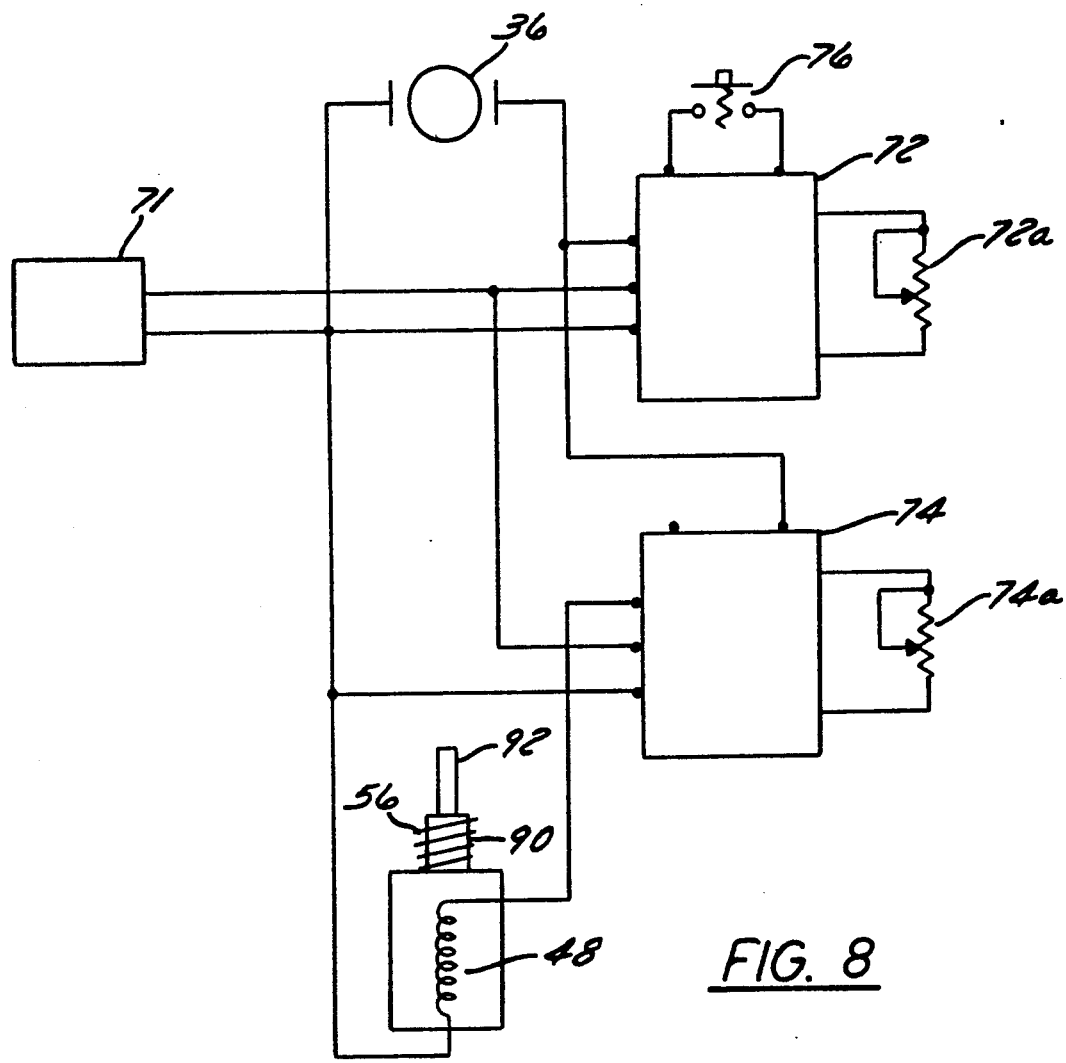
FIG. 8. is an electrical schematic of the system operating the solenoid valve assembly and grinder of the present invention.

Reference is now made to FIG. 8 wherein it can be seen that a 120 volt ac power source 71 is connected to grinder 36, solenoid 48 and voltage input terminals of grinder timer 72 and solenoid timer 74. Timer 72 is preferably a single shot timer such as a Model Q2 Serials solid state timer available from National Controls Corporation. Timer 74 is preferably a "delay-on-break" timer such as a Model Q3 Series timer available from National Controls Corporation. The duration of timer intervals may be adjusted for each timer by potentiometer 72a and 74a respectively.

Figure 9:
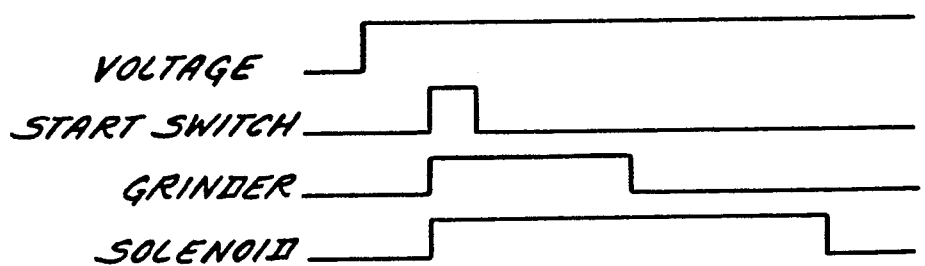
FIG. 9. is the logic timing diagram of the circuit of FIG. 8.

When the normally open start switch 76 is momentarily closed, the loads of timer 72 and 74 (that are respectively grinder 36 and solenoid 48) are energized. This sequence is apparent from the timing diagram of FIG. 9. Grinding of the coffee beans transported to grinder 36 from the hoppers by auger mechanisms 38 commences. Simultaneously, shutter plate 52 is moved to its open position, allowing coffee grounds to be ejected through registered openings 58 and 66 and evenly distributed by deflection against tab finger 54 over the brew basket 30. When timer 72 goes into its off state, it de-energizes grinder 36 and signals timer 74. Timer 74 then delays for a short time interval the de-energization of solenoid 48. Following the lapsing of the time interval, solenoid 48 is de-energized and shutter plate 52 is retracted into its closed position, thereby preventing moisture from the brewing cycle from entering into grinder head 36.

As is readily inferred from a reading of the detailed description and the appended drawing, the present invention is not only suitable for use with combination coffee grinders and brewers, but with any beverage making apparatus where it is desirable that the solid component be distributed evenly in the region of mixture and that excess moisture be prevented from moving into the solid component holding area. Thus, while the invention has been described in detail with respect to the preferred embodiment, it is not intended that the scope of the invention be limited other than set forth in the following claims.

I claim:

1. A beverage making apparatus having a device for transporting a stream of a solid component of a beverage mixture to and through a passageway into a region in which the liquid component of the beverage mixes with said solid component, said apparatus further comprising:
   (a) a valve assembly having a plurality of elements defining said passageway, said valve assembly including a plate movable between a closed position and an open position, said plate defining an opening which registers with said passageway when said plate is in said open position;
   (b) means connected to said plate for moving said plate and said opening into and out of registry with said passageway, thereby preventing moisture from said mixture from moving from said region through said passageway and
   (c) a finger tab connected to said plate and extending through said passageway a distance sufficient for manual manipulation of said plate between said open and closed positions.

2. The apparatus of claim 1 in which said moving means comprises a solenoid and solenoid plunger responsive to the actuation of the transporting device for moving said first plate from said closed position to said open position thereby allowing said solid component stream to be ejected through said passageway.

3. The apparatus of claim 2 in which said moving means further comprises a spring biasing said plate into said closed position thereby sealing said passageway when said solenoid is not actuated and preventing moisture from passing through said passageway when said liquid component is being delivered to said region.

4. The apparatus of claim 1 in which said plate and said moving means move in substantially the same plane.

5. The apparatus of claim 4 in which said plate and moving means are directly connected.

6. The apparatus of claim 5 in which moving means comprises a solenoid and a solenoid plunger connected to said plate.

7. A coffee making apparatus having a grinder with a first opening through which ground coffee is ejected and a coffee ground receiving and brewing area for mounting a brewing basket, said apparatus further comprising:
   (a) a valve assembly having a plurality of elements defining a passageway communicating with said first opening and said coffee ground receiving area, one of said elements being a plate having a second opening with a member extending through said passageway into said coffee ground receiving and brewing area a sufficient distance to intersect and deflect a portion of a coffee ground stream that is ejected by said grinder head when operative; and
   (b) means connected to said plate for moving said plate and said second opening into and out of registry with said first opening.

8. The apparatus of claim 7 in which said moving means comprises a solenoid and solenoid plunger responsive to the actuation of the grinder for moving said first plate to a position in which said first and second openings are in registry thereby allowing coffee grounds to be ejected through said passageway.

9. The apparatus of claim 8 including an auger mechanism for transporting coffee beans from a hopper to said grinder.

10. The apparatus of claim 9 including a timing means for energizing said grinder and solenoid simultaneously, said timing means de-energizing said grinder after a first predetermined time interval and de-energizing said solenoid a second predetermined time interval later.

11. The apparatus of claim 8 in which said moving means further comprises a spring biasing said plate and said second opening into a position in which said first and second openings are out of registry thereby sealing said passageway and preventing moisture from reaching the grinding head when coffee is being brewed.

12. The apparatus of claim 7 in which said plate and said moving means move in substantially the same plane.

13. The apparatus of claim 12 in which said plate and moving means ar directly connected.

14. The apparatus of claim 7 in which said member can be manually moved so that said first and second openings are in substantial registry.

15. A slide valve assembly in a coffee grinder and brewer apparatus for preventing moisture from seeping through a passageway connecting the grinder to the brewing area by closing the passageway during the brewing cycle, said assembly comprising;
  (a) a shutter having an opening; and
  (b) means directly connected to said shutter for moving said shutter and said opening into and out of registry with said passageway, said moving means and said shutter moving in essentially the same plane, said shutter plate having a tab extending downwardly into said brewing area a distance sufficient to deflect at least a portion of the coffee ground stream ejected by said grinder through said passageway.

16. The assembly of claim 15 including a biasing element for biasing said shutter and opening out of registry with said passageway.

17. In combination with a coffee grinding and brewing apparatus having a grinder with a first opening communicating with a coffee brewing area, a slide valve assembly comprising;
  (a) a support bracket having spaced parallel legs secured to said grinder about said first opening and a support plate;
  (b) a solenoid housing secured to said support plate and a solenoid mounted in said housing, said solenoid having an plunger connected to a shutter plate and said shutter plate positioned for sliding movement between said parallel legs and having a second opening, said solenoid responsive to said grinder being activated for moving said shutter plate to an open position in which said first and second openings are in registry;
  (c) a spring in contact with said shutter for biasing said shutter plate into a closed position when said grinder and said solenoid are deactivated; and
  (d) a tab finger integral with said shutter and extending downwardly therefrom into said brewing area a distance sufficient to deflect at least a portion of a stream of any coffee grounds being ejected by said grinder through said first and second openings.

18. The combination of claim 17 including a low friction bearing surface for supporting said shutter plate.

19. The combination of claim 17 in which said spring is coiled about said solenoid plunger and abuts one end of said shutter plate, said spring being compressed when said shutter plate is moved into the closed position.

20. The combination of claim 17 in which said spring is attached at one end to said shutter plate and at the other end to said bracket, said spring being extended when said plate is moved into the closed position.

* * * * *